Dec. 29, 1964 E. GESSNER 3,162,931

METHOD OF FABRICATING MAGNETIC CORE ARRAYS

Original Filed Jan. 9, 1957 3 Sheets-Sheet 1

INVENTOR
EUGENE GESSNER

BY

Marshall M. Truex

ATTORNEY

Dec. 29, 1964 E. GESSNER 3,162,931

METHOD OF FABRICATING MAGNETIC CORE ARRAYS

Original Filed Jan. 9, 1957 3 Sheets-Sheet 2

3,162,931
METHOD OF FABRICATING MAGNETIC CORE ARRAYS

Eugene Gessner, Towson, Md., assignor to International Business Machines Corporation, New York, N.Y., a corporation of New York Application Aug. 6, 1958, Ser. No. 753,860, now Patent No. 3,064,334, dated Nov. 20, 1962, which is a division of application Ser. No. 633,370, Jan 9, 1957, now Patent No. 2,910,675. Divided and this application Aug. 18, 1960, Ser. No. 56,082
3 Claims. (Cl. 29—155.5)

This invention relates to magnetic core memory arrays and is directed more particularly to processes for the fabrication of rigid magnetic core arrays.

This application is a division of my copending application, Serial No. 753,860, filed August 6, 1958, now Patent No. 3,064,334, which is a division of an application, Serial No. 633,370, filed January 9, 1957, now Patent No. 2,910,675, issued October 27, 1959.

Magnetic core arrays are well known in the art and have the form of a lattice of magnetic cores in which the cores have two well defined extremes of magnetization for representing two values necessary to store binary numbers. A detailed explanation of the theory of operation of a typical array is described in the patent of E. W. Bauer and M. K. Haynes, Patent No. 2,889,540, issued June 2, 1959.

Heretofore, magnetic core arrays of the type described have been assembled manually with the windings being threaded through the cores. This technique of assembly has become increasingly time consuming and expensive due to the requirements of greater capacity memory arrays and the tendency of using smaller sized cores.

Briefly stated, this invention is a process for assembling a rigid array of cores in which the windings received in the core openings are constructed of coaxially spaced conductors insulated from each other and in which conductive areas are constructed to connect with the coaxially spaced conductors to form series linking circuits.

An object of this invention is to provide an improved method for assembling a magnetic core array.

It is another object of this invention to provide an improved process for fabrication of a magnetic core array.

It is an object of this invention to provide a process for fabrication of a magnetic core array having coaxially spaced conductors insulated from each other and in which conductive areas are constructed to connect with the coaxially spaced conductors to form series linking circuits.

Other objects of the invention will be pointed out in the following description and claims and illustrated in the accompanying drawings, which disclose, by way of example, the principle of the invention and the best mode, which has been contemplated, of applying that principle.

Figure 1:
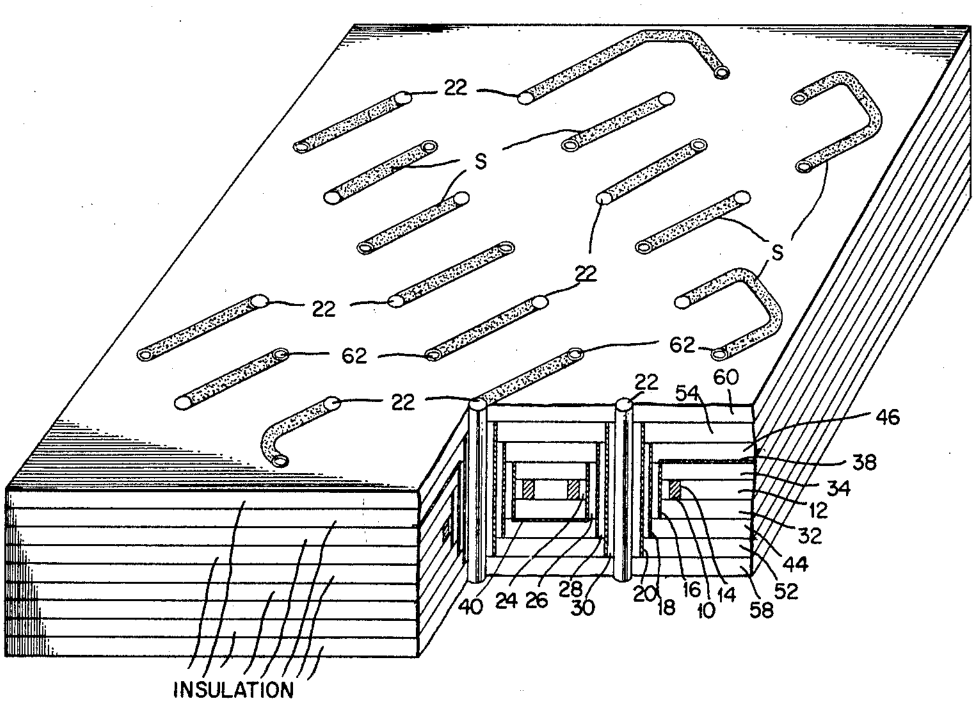
FIGURE 1 is a perspective view, partly in section, of a major surface of a core array and further illustrates the winding arrangement of one embodiment of this invention.

Referring to FIGURE 1, a single plane of a typical three dimensional array has toroidal magnetic cores 10 arranged in rows and columns and linked by X windings, Y windings, a Z winding, and an S winding. The patent of E. W. Bauer and M. K. Haynes, Patent No. 2,889,540, to which reference was made previously, describes the manner of electrically selecting a particular core in a core plane by the X and Y windings, the selection of a particular plane in a three dimensional array using the inhibit or Z winding, and the sensing of the magnetic change of a particular core using the S winding. A sheet of material 12 receives the magnetic core 10 in each of the openings 14. Each core embraces coaxially spaced elements comprising conducting and insulating members wherein conductive cylinders 16, 18, and 20 are spaced about a rod 22 and are separated from each other and from the core by cylinders of insulating material 24, 26, 28, and 30.

Figure 2:
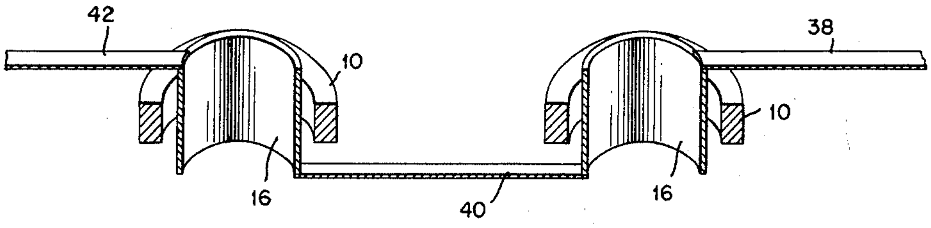
FIGURE 2 is a diagrammatical view in perspective of a pair of cores and linking conductors arranged in accordance with the principles of this invention as illustrated in FIGURE 1.

A pair of plates 32 and 34 have a plurality of openings therein such that each opening has a diameter sufficient to embrace the end of the cylinder 16 when the plates are positioned on opposing major surfaces of the sheet 12. The Y conductor comprises a conductor 38 on the upper surface of the plate 34, the cylinder 16, a conductor 40 on the lower surface of the plate 32, the cylinder 16 for the adjacent core in that row, and other elements of like construction arranged in a similar manner across the array. FIGURE 2 further illustrates the winding arrangement, and similar series Y windings link each core in all of the other rows. A pair of plates 44 and 46 have a plurality of openings therein of a diameter sufficient to embrace the ends of the cylinder 18 when the plates 44 and 46 are positioned adjacent the plates 32 and 34 respectively. The X conductors comprise the cylinders 18 and connecting conductors on the sheets 44 and 46 with each X conductor linking each core in a column of cores. In conformity with the usual practice in the art, X and Y conductors link individual cores in the same sense. In a similar manner, a pair of plates 52 and 54 are positioned adjacent the plates 44 and 46 respectively, embrace the ends of the cylinders 20, and support connecting circuitry for the series Z windings. Similarly, a pair of sheets 58 and 60 are positioned adjacent the plates 52 and 54 respectively, embrace the ends of the rod 22, and supports the series S winding arranged according to the pattern shown on the sheet 60 and a pattern of like purpose on sheet 58 (not shown). A plurality of conductors 62 pass through openings in all of the sheets to complete the continuous S winding and pass current from one side of the plane to the other to preserve the sense of the S winding.

In FIGURE 1, it will be noted that the section as taken does not show all of the conductors which connect to the core-linking conductors. Accordingly, FIGURE 3 is merely an illustration of a general nature wherein all of the connecting conductors are rotated about the axis of the rod 22 until all can be shown in the same sectional plane to indicate that each coaxially-spaced conductor is connected to external circuitry to form the X, Y, Z and S windings.

Figures 3, 4, 5, 6:
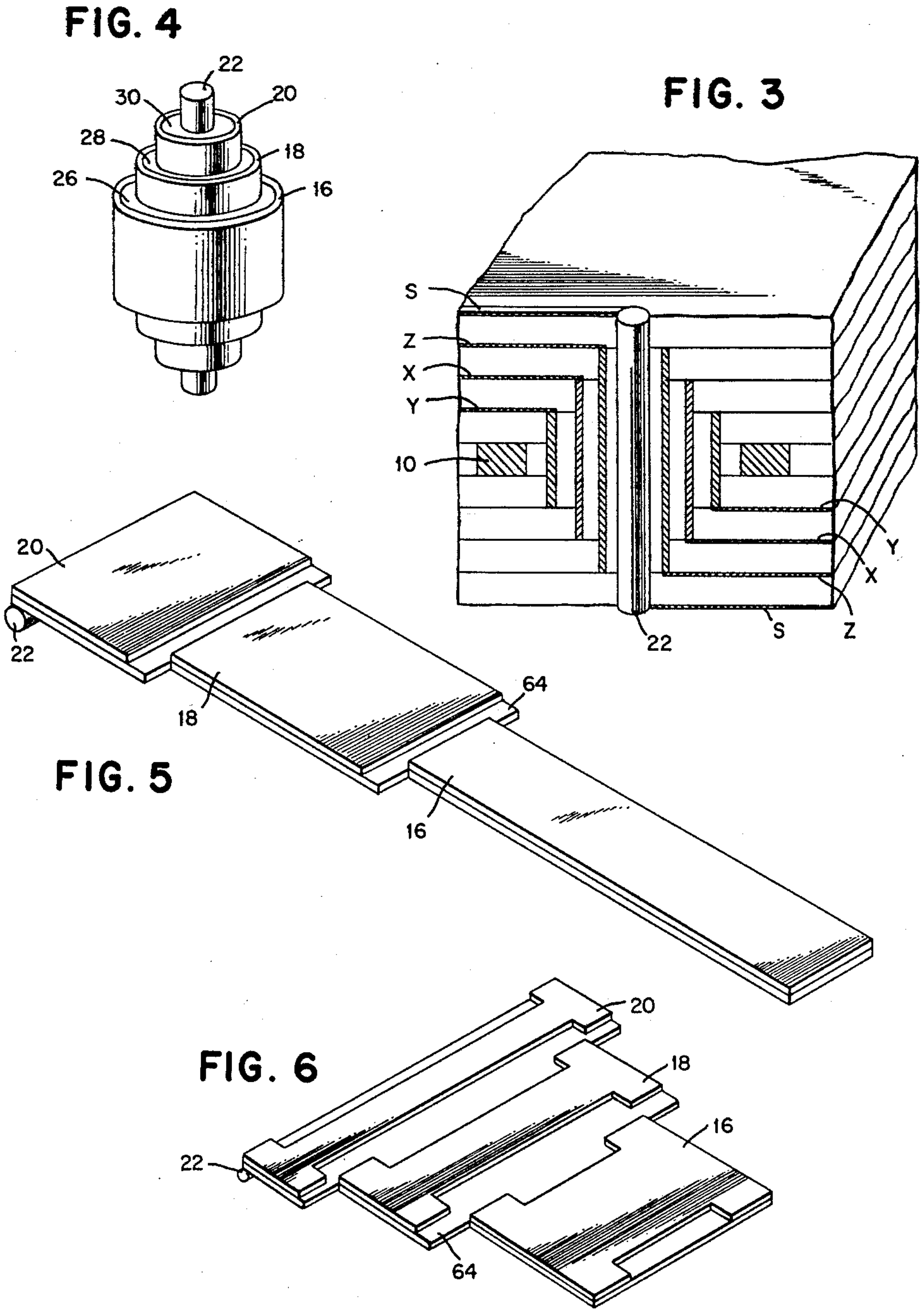
FIGURE 3 is a perspective view of a section of the core array of the embodiment of FIGURE 1 showing core-linking conductors constructed according to the principles of this invention.
FIGURE 4 is a perspective view of a plug such as used in the embodiment of FIGURE 1 having coaxially spaced conductors constructed in accordance with the principles of this invention.
FIGURE 5 illustrates the arrangement of elements used in the construction of a single plug having coaxially spaced windings such as used in the embodiment of FIGURE 1.
FIGURE 6 illustrates a structural modification of the elements used in the construction of the plug shown in FIGURE 5.

In FIGURE 4, the coaxial plugs are fabricated by first arranging the elements of the structure according to FIGURE 5. A sheet of insulating material 64 such as the resin known by the trade name Mylar is cut in the shape of a series of rectangles of decreasing dimensions with the widths corresponding to the desired heights of the cylinders. The rectangular pieces of conductive material 16, 18, and 20, are made from sheet such as annealed beryllium-copper or the like, and are cut according to the desired dimensions of the cylinders and cemented or otherwise secured to the sheet. Next the rod 22 is positioned under the sheet near the end of conductor 20, and the insulating sheet 64 and conductors are rolled clockwise about the rod. After the plug is first formed in this manner, it may be heated and compressed in a mould to fuse the plug into a uniform and unitary structure as shown in FIGURE 4. Such a plug may be built having the largest diameter less than 0.030 inch for insertion into the openings of very small cores used at the present time having 0.050 inch outside diameter with openings 0.030 inch in diameter and a thickness of 0.15 inch. While particular dimensions have been mentioned in this regard, it is to be understood that other sized plugs and cores may be used and those described are not to be considered limiting.

Plugs may be constructed in accordance with the invention having coaxially spaced conductors which are not complete cylinders. Such cores may be constructed by the method just described using conductors having the shape of "I" as shown in FIGURE 6. The cut-away portions reduce the possibility of electrical short circuits between conductors and reduce the inter-conductor capacitance.

While certain materials have been mentioned for use as the conductive elements in the foregoing description of the plugs, the elements 16, 18, and 20 may be first painted upon the sheet 64 using conductive paint. Then the conductive areas are plated to the thickness desired, and the plug formed in the manner described. Also, the plugs may be constructed by cutting the cylinders 16, 18 and 20 from metal tubes of conductive material, placing the tubes around the rod 22 in a supporting jig, and extruding a nonconductive plastic material into the spaces between the cylinders. Such a method of construction is adaptable to automatic manufacturer.

Referring now to FIGURE 1, the insulating cylinder 24 between the cores 10 and the Y conductors 16 may be formed as a strip and attached to the conductor 16 before insertion of the plug in the core opening or it may be formed by spraying or painting an insulating material within the core openings before insertion of the plug.

To summarize the construction of array in accordance with the foregoing description, the openings 14, 62 (and others if required for converting circuitry) are formed in the sheet 12, and then the cores are deposited in the openings 14. If desired, a bonding agent may be applied to the sheet and cores to hold the cores in position. The insulators 24 are formed by coating the core openings with an insulating material, followed by insertion of the individual plugs in each core opening. Then, the sheets 32 and 34 are positioned, each covering a respective one of the opposing major surfaces of the sheet 12. The Y circuitry for the conductors 16 is now developed on the sheets 32 and 34 by any method for depositing the predetermined pattern arrangement of conductive areas known in the art such as metal spraying, photographic electrodeposition, or other like process. Subsequently, the sheets 44 and 46 are placed upon the sheets 32 and 34 respectively, and the X circuitry is developed on the accessible major surfaces of the sheets 44 and 46 to connect the conductors 18 in series circuits for each column. In like manner, the sheets 48 and 50 are positioned and the Z conductors constructed. Similarly, the sheets 52 and 54 are positioned and the S conductors constructed with this construction including the forming of the conductors 62.

It is pointed out that the sheet 12 may be of wax, resin, or like material which can be removed in any suitable way, as for example, heat or chemicals after fabrication of the array. The cores are retained in position by the plugs after removal of the sheet 12. With the sheet 12 removed the cores may be cooled by convection.

While the width of the insulating sheets 32, 34, 44, 46, 48, 50, 52, and 54 are shown to be approximately the thickness of the cores, in practice the sheets could be quite thin depending only upon the insulating properties of the material used. Accordingly, the insulating sheets may be formed by alternate coatings of insulating material, and the metallic connecting X, Y, Z and S conductors.

Figure 7:
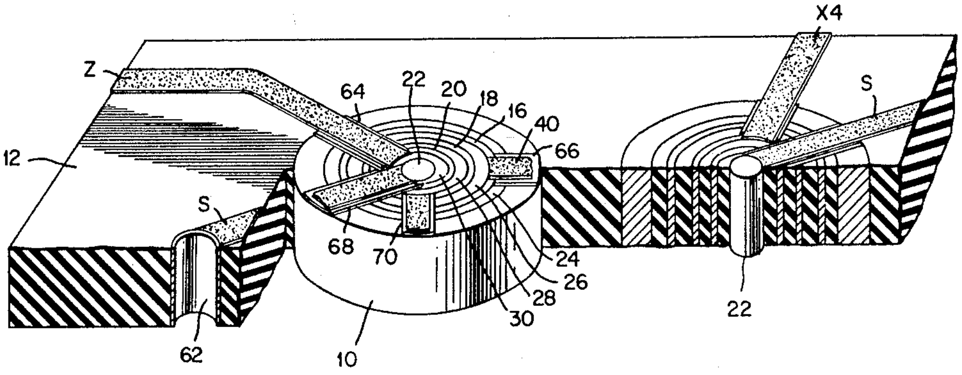
FIGURE 7 is a portion of an array illustrating another embodiment of the invention.

FIGURE 7 shows a portion of an array illustrating another embodiment of the invention having a single plane of a three dimensional array of magnetic cores in which the coaxial conductors are of equal length. A single sheet 12 contains the cores, and an insulating material is applied to selected portions of the sheet and plugs to isolate connecting circuitry from the cores and other core-linking conductors. One of these portions is illustrated as an area 64, which is an insulating coating applied over the plug to insulate the Z winding from the core 10 and the conductors 16 and 18. Similarly, other coated areas are illustrated by the areas 66, 68, and 70 to insulate the Y, S, and X circuitry respectively. Such coated areas for each core may be applied through a template and thereafter X, Y, Z and S connecting circuitry may be simultaneously constructed by depositing the predetermined pattern arrangement of conductive areas by methods well known in the art. Accordingly, all connecting circuitry is applied in one step rather than in successive steps of alternately constructing layers of insulation and conductive patterns.

Figure 8:
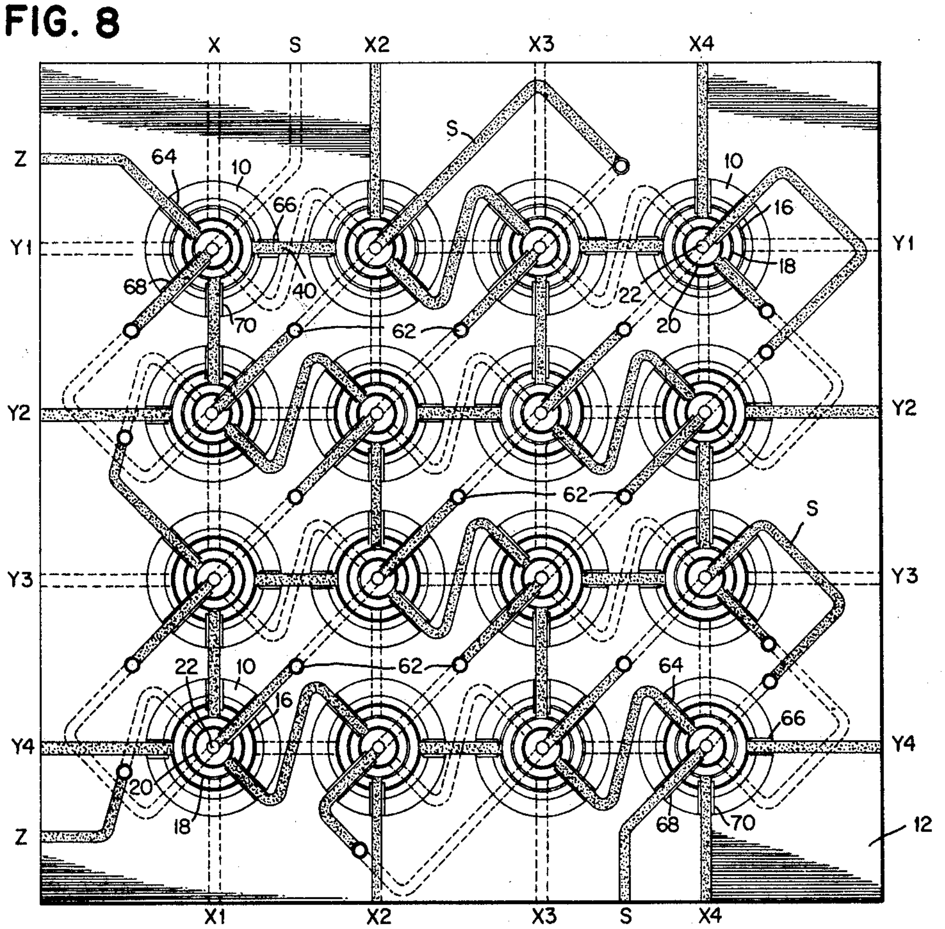
FIGURE 8 is a view of a major surface of the embodiment of the core array illustrated in FIGURE 7 constructed in accordance with the principles of this invention.

The array shown in part in FIGURE 7 is illustrated in plan view in FIGURE 8. It will be noted from FIGURE 8 that each of the various conductors may be exposed on the major surfaces of the arrays in this embodiment; whereas, in the embodiment of FIGURE 1, all conductors except the last formed are not exposed.

The particular pattern of linking cores using X, Y, Z and S conductors to form an array as above described is but one of many feasible winding configurations, and the particual form shown in FIGURES 1 and 7 is not to be considered as limiting the invention since the construction taught is applicable to many circuit arrangements.

The terminus of each X, Y, Z and S conductor may be arranged to connect to external circuitry to allow coupling to external apparatus for a two-dimensional array or to interconnecting groups of single planes to provide a three-dimensional memory unit.

While there have been shown and described and pointed out the fundamental novel features of the invention as applied to a preferred embodiment, it will be understood that various omissions and changes in the form and details of the device illustrated and in its operation may be made by those skilled in the art without departing from the spirit of the invention. It is the intention therefore, to be limited only as indicated by the scope of the following claims.

What is claimed is:

1. The method of fabricating a magnetic core array having magnetic cores with the conductors in each core coupled to those in other cores by connecting circuits, comprising the steps of forming a plurality of openings in a sheet of material, depositing a magnetic core having an aperture therein in each of said openings, placing a plug having coaxial coextensive concentric conductors insulated from each other in each core aperture, said concentric conductors having their ends exposed and uninsulated, depositing insulating material on portions of the ends of the concentric conductors and on portions of the cores to isolate each connecting circuit of core linking conductors from other core linking conductors and from said cores, and forming conductive patterns over the sheet and over said insulated areas to connect the ends of said concentric conductors in series linking groups.

2. The method of fabricating a magnetic core array having coaxial concentric windings and circuit interconnections comprising the steps of forming openings in a sheet of material, depositing a magnetic core having an aperture therein in each opening, placing a plug having coaxial concentric windings insulated from each other through the apertures in each core, said coaxial concentric windings having their ends exposed and uninsulated, forming conductive circuit patterns on said sheet of material which are insulated from said core, said patterns interconnecting the ends of the coaxial concentric winding of largest diameter in each core, placing insulating material over the circuit patterns and ends of the connected coaxial concentric windings, forming conductive circuit patterns over the last mentioned insulating material, said patterns interconnecting the end of the coaxial concentric winding of the next smaller diameter in each core, placing insulating material over the last mentioned circuit patterns and the ends of the connected coaxial concentric windings, forming conductive patterns over the last mentioned insulating material, said patterns interconnecting the end of the coaxial concentric windings of the next smaller diameter in each core, placing insulating material over the last mentioned circuit patterns and the ends of the connected coaxial concentric windings and forming conductive circuit patterns over the last mentioned insulating material, said patterns interconnecting the end of the center-most windings.

3. The method of fabricating a magnetic core array having coaxial concentric windings and circuit interconnections comprising the steps of forming openings in a sheet of material, depositing a magnetic core having an aperture therein in each opening, placing a plug having coaxial concentric windings insulated from each other through the apertures in each core, said coaxial concentric windings having their ends exposed and uninsulated, forming conductive circuit patterns on said sheet of material which are insulated from said core, said patterns interconnecting the end of the coaxial concentric winding of the largest diameter in each core, placing insulating material over the circuit patterns and ends of the connected coaxial concentric windings, forming conductive circuit patterns over the insulating material, said patterns interconnecting the end of the coaxial concentric winding of the next smaller diameter in each core, placing insulating material over the last mentioned circuit patterns and ends of the connected coaxial concentric windings, and forming conductive patterns over the insulating material, said patterns interconnecting the end of the coaxial concentric winding of the next smaller diameter in each core.

References Cited in the file of this patent

UNITED STATES PATENTS 2,784,391 Rajcman et al. ---------- Mar. 5, 1957
2,824,294 Saltz ---------------- Feb. 18, 1958
2,970,296 Horton --------------- Jan. 31, 1961